Patented Dec. 30, 1930

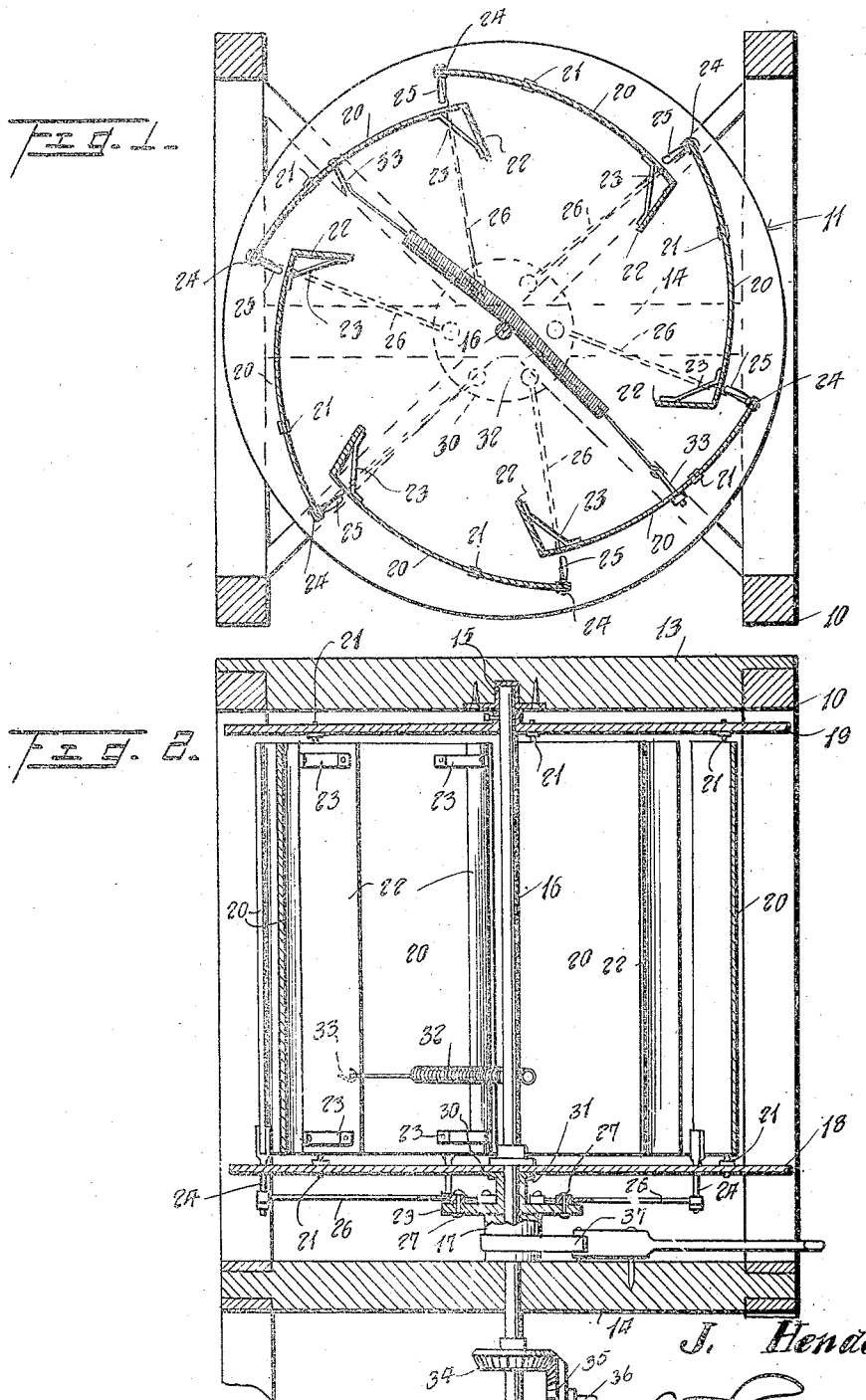

1,787,072

UNITED STATES PATENT OFFICE

JOHN HENDERSON, OF PICHER, OKLAHOMA

WINDMILL

Application filed July 12, 1928. Serial No. 292,052.

This invention relates to a windmill and it is generally aimed to provide an improved and more practical construction over that disclosed in Letters Patent No. 720,427, issued to me on February 10, 1903.

By the present improvement, it is particularly aimed to provide a construction in which the wings have straight inwardly extending portions in order to give the windmill a material increase in power by serving to deflect the wind to the opposite side of the wheel so that it will function like a turbine wind wheel.

Another object is to provide a novel construction wherein a governor is unnecessary in connection with the wings and in which the wheel tends to close in time of very high wind due to centrifugal force.

Various additional objects and advantages will in part be pointed out in the description following and otherwise become apparent from a consideration thereof.

An operative embodiment is shown in accompanying drawings wherein:

Figure 1 is a view in transverse section showing my improved windmill, and

Figure 2 is a view thereof in section and taken substantially vertically.

Referring specifically to the drawings, 10 designates a suitable supporting framework or tower of any desired construction which may be erected, guyed or braced if desired. Such tower or framework 10 may of course be of any size and materials preferred and it operatively mounts a windmill generally designated 11 and obviously of any desired size.

The tower 10 has upper and lower transverse bars 13 and 14. Also bar 13 has a bearing or socket 15 in which the upper end of a vertical power shaft 16 is journaled. Such power shaft also passes through the bar 14 and is journaled therein. Fixed to the shaft 16 and resting on the bar 14 is a hub 17. Also resting on the hub 17 and keyed to the shaft 16 is a lower disk or plate 18 while a coacting disk or plate 19 is arranged adjacent the top of shaft 16 and rotatably mounted thereon.

Between the plates 18 and 19 are arranged, any desired number of wings 20 each of which has off center or eccentric trunnions 21 pivoted in the plates or disks 18 and 19. Each wing 20 has a straight inwardly extending flange or portion 22, which is preferably reenforced and braced by the diagonal element 23. It will be noted that the trunnions 21 are nearer to the edges of the wings 20 where straight flanges 22 are provided.

At the other longitudinal edges, studs 24 extend downwardly through substantially radial slots 25 provided in the plate or disk 18. Below the latter disk or plate, rods or pitmen 26 are pivotally connected to the studs 24 and at their inner ends are pivoted at 27 to a flange 29 of the hub 17. If desired, pitmen 26 may be secured to a flange 31 also on said hub 17. A contractile coil spring 32 is fastened detachably as at 33 to diametrically opposite wings, thus connecting all of the wings together for movement in unison since each is connected to the movable hub 17 by the rods or pitmen 26.

Power derived by the windmill in operation may be supplied to any suitable source as through the medium of a gear wheel 34 keyed on shaft 16 and meshing with a gear wheel 35 keyed on a shaft 36 adapted to drive any suitable device.

Associated with the hub 17 is a suitable manually operable brake 37, the same being but conventionally shown.

In the operation of the improved windmill, I find that by the addition of the straight wing portions or flanges 22, nearly double the power may be derived over that generated by merely arcuate wings as disclosed in my aforesaid patent. The straight wing is so arranged as to deflect the wind across to the opposite side of the wheel, making the action like that of a turbine. This action also tends to close the wings or wheel in the presence of a very high wing or racing of the wheel since the speed of the wheel and consequent centrifugal force naturally closes the wings.

Various changes may be resorted to provided they fall within the spirit and scope of the invention.

I claim as my invention:—

A windmill having a relatively unobstructed interior and comprising a shaft, plates carried thereby, wings pivoted eccentrically to the plates and arranged substantially in the path of a circle, said wings at one side edge having inwardly extending flanges for the purpose specified, a substantially diametrically arranged contractile spring connecting certain of the wings between said axis and flanges, a hub journaled on said shaft below the plates, connections from said hub to each of said wings including studs depending from the wings, the lowermost plate having slots through which said studs pass and in which they move.

In testimony whereof I affix my signature.

JOHN HENDERSON.